(12) United States Patent
Pursifull

(10) Patent No.: US 9,103,246 B2
(45) Date of Patent: Aug. 11, 2015

(54) SYSTEM AND METHOD FOR REDUCING VACUUM DEGRADATION IN A VEHICLE

(71) Applicant: Ford Global Technologies, LLC, Dearborn, MI (US)

(72) Inventor: Ross Dykstra Pursifull, Dearborn, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 387 days.

(21) Appl. No.: 13/759,745

(22) Filed: Feb. 5, 2013

(65) Prior Publication Data

US 2013/0146039 A1     Jun. 13, 2013

Related U.S. Application Data

(60) Continuation-in-part of application No. 13/612,488, filed on Sep. 12, 2012, now Pat. No. 8,640,680, which is a division of application No. 12/917,862, filed on Nov. 2, 2010, now Pat. No. 8,267,072.

(51) Int. Cl.
| | |
|---|---|
| *F02B 41/00* | (2006.01) |
| *F01M 1/02* | (2006.01) |
| *B60T 17/02* | (2006.01) |

(52) U.S. Cl.
CPC . *F01M 1/02* (2013.01); *B60T 17/02* (2013.01)

(58) Field of Classification Search
CPC .................................. F02B 39/14; F02B 39/16
USPC ........... 123/572–574, 198 C; 180/65.21, 313; 60/397
See application file for complete search history.

(56) References Cited

U.S. PATENT DOCUMENTS

| | | | |
|---|---|---|---|
| 3,991,854 A | 11/1976 | Tilley | |
| 4,328,669 A | 5/1982 | Mort | |
| 4,332,302 A | 6/1982 | Kosmanski | |
| 4,356,805 A | 11/1982 | Kler | |
| 4,412,416 A | 11/1983 | Van House | |
| 4,458,641 A * | 7/1984 | Wickramasuriya | ....... 123/195 A |
| 4,491,094 A | 1/1985 | Ogawa | |
| 4,738,112 A | 4/1988 | Nomura et al. | |
| 5,501,190 A | 3/1996 | Okubo et al. | |
| 5,511,523 A | 4/1996 | Masuda | |
| 5,669,366 A | 9/1997 | Beach et al. | |
| 5,676,101 A | 10/1997 | Kawai et al. | |
| 5,836,280 A | 11/1998 | Miyazawa | |
| 5,910,098 A | 6/1999 | Harima | |
| 5,918,573 A | 7/1999 | Killion | |
| 6,019,585 A | 2/2000 | Abelen et al. | |
| 6,079,629 A | 6/2000 | Morikawa et al. | |
| 6,343,572 B1 | 2/2002 | Pfaff et al. | |
| 6,435,170 B1 | 8/2002 | Hamelink et al. | |

(Continued)

FOREIGN PATENT DOCUMENTS

| | | |
|---|---|---|
| DE | 4107049 A1 | 9/1992 |
| EP | 0119135 A1 | 9/1984 |

(Continued)

*Primary Examiner* — Hung Q Nguyen
(74) *Attorney, Agent, or Firm* — Julia Voutyras; Alleman Hall McCoy Russell & Tuttle LLP

(57) ABSTRACT

An engine including a lubricated vacuum source is disclosed. In one example, engine oil entrained in gases lubricates a vacuum pump. The approach may provide for improved efficiency when generating vacuum.

20 Claims, 3 Drawing Sheets

(56) References Cited

U.S. PATENT DOCUMENTS

| | | |
|---|---|---|
| 6,684,864 B1 | 2/2004 | Busen et al. |
| 7,086,366 B1 | 8/2006 | Killion |
| 7,520,734 B2 | 4/2009 | Luedtke et al. |
| 7,674,096 B2 | 3/2010 | Sundheim |
| 8,156,926 B2 | 4/2012 | Weber et al. |
| 2002/0174653 A1 | 11/2002 | Uzkan |
| 2003/0019473 A1 | 1/2003 | Wild et al. |
| 2003/0172891 A1 | 9/2003 | Suzuki |
| 2003/0213454 A1 | 11/2003 | Grieser et al. |
| 2004/0103889 A1 | 6/2004 | Akiyama et al. |
| 2004/0112346 A1 | 6/2004 | Ahlborn et al. |
| 2004/0134459 A1 | 7/2004 | Korenjak et al. |
| 2006/0070601 A1 | 4/2006 | Korenjak et al. |
| 2010/0294218 A1 | 11/2010 | Ruppel et al. |
| 2011/0174244 A1 | 7/2011 | Maki et al. |

FOREIGN PATENT DOCUMENTS

| | | |
|---|---|---|
| EP | 0210145 A2 | 1/1987 |
| EP | 2249041 A2 | 10/2010 |
| JP | S57320 A | 1/1982 |
| JP | H10252435 A | 9/1998 |

\* cited by examiner

SYSTEM AND METHOD FOR REDUCING VACUUM DEGRADATION IN A VEHICLE

CROSS REFERENCE TO RELATED APPLICATIONS

The present application is a continuation-in-part of U.S. patent application Ser. No. 13/612,488 filed Sep. 12, 2012, the entire contents of which are incorporated herein by reference for all purposes, which is a divisional of U.S. patent application Ser. No. 12/917,862 filed Nov. 2, 2010, the entire contents of which are incorporated herein by reference for all purposes.

BACKGROUND/SUMMARY

A vehicle may include a vacuum system to operate or to assist in the operation of various devices. In particular, vacuum may be a way to assist a driver applying vehicle brakes or other vacuum operated devices. Vacuum may be provided in some vehicle via a vacuum pump because the engine operates frequently with a positive intake manifold pressure. Some vacuum pumps may be electrically driven (typically on-demand) by a motor while others are mechanically driven (typically operated continuously) via the vehicle's engine. Vane vacuum pumps have the capacity to produce vacuum over long vacuum pump life cycle. However, if the vane vacuum pump is not properly lubricated the vane vacuum pump life cycle may be reduced and the vane vacuum pump may not be able to produce a desired level of vacuum.

The inventor herein has recognized the above-mentioned disadvantages and has developed an engine vacuum system, comprising: an engine including a crankcase vent and an oil separator located along the crankcase vent; and a vacuum pump in fluidic communication with the engine and a vacuum consumer, a vacuum pump inlet port in fluidic communication with a passage entering an interior of the engine, the passage absent an oil pump along its length.

By directing gases from within an engine's oiled compartment to a vacuum pump, it may be possible to lubricate the vacuum pump with engine oil that may be entrained within the gases. Further, the gases may be returned to an interior portion of the engine so that they may be subsequently combusted by the engine (or the oil mist may return as liquid oil to the engine oil). In this way, it may be possible to lubricate the vacuum pump without an oil pump directing oil to the vacuum pump. In one example, gases from the engine may be drawn to the vacuum pump inlet only in response to a vacuum level of a vacuum reservoir exceeding a threshold vacuum level. Consequently, gas flow from the engine to the vacuum pump inlet may occur only during select conditions.

The present description may provide several advantages. In particular, the approach can improve the operation of a vacuum pump that has oil wetted seals. Further, the approach can reduce vehicle emissions for vehicles that have vacuum pumps. Further still, the vacuum pump may be lubricated without an oil pump supplying oil to the vacuum pump.

The above advantages and other advantages, and features of the present description will be readily apparent from the following Detailed Description when taken alone or in connection with the accompanying drawings.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

Figure 1:
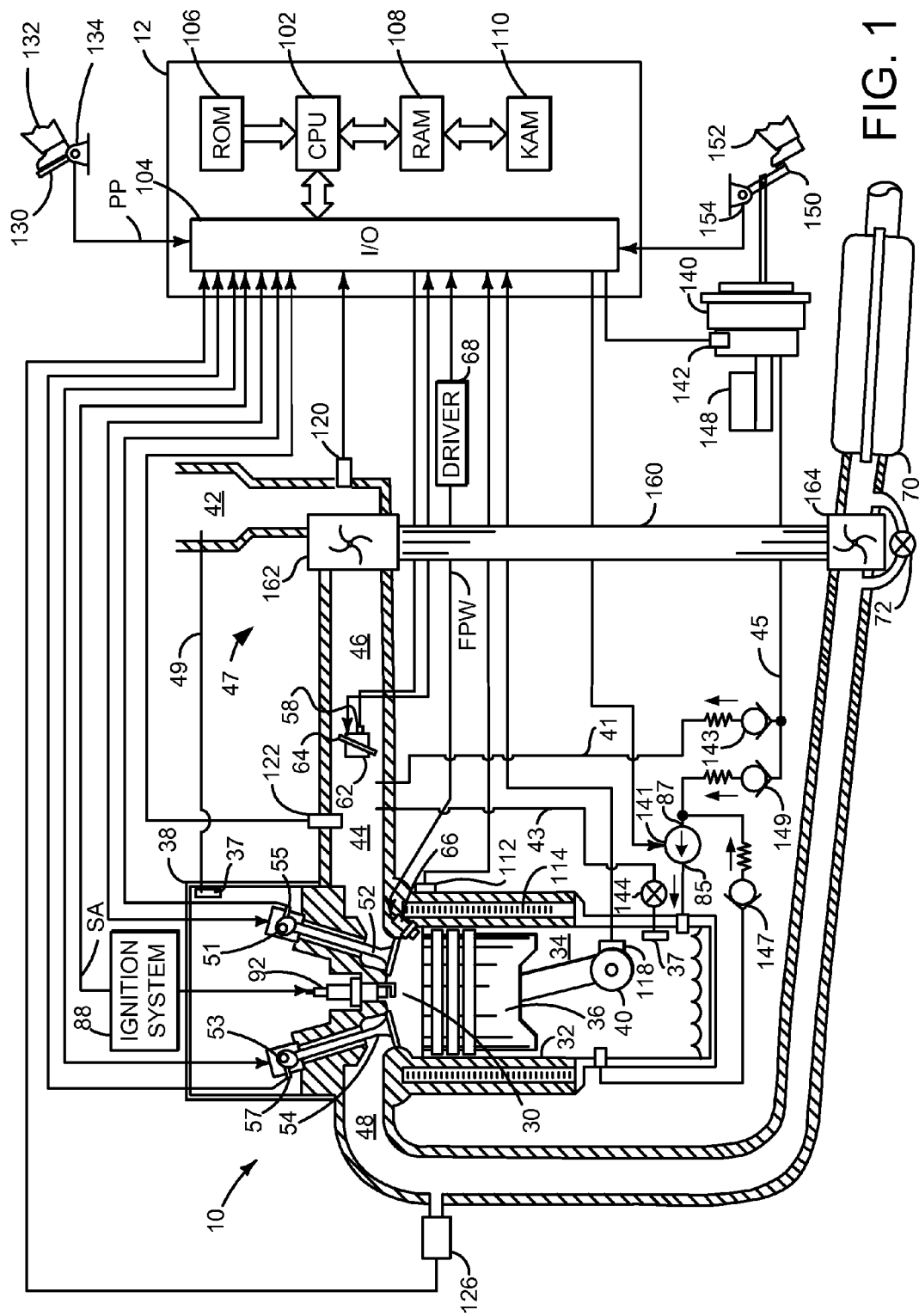
FIG. 1 shows a schematic depiction of an engine and vacuum system.
Figure 2:
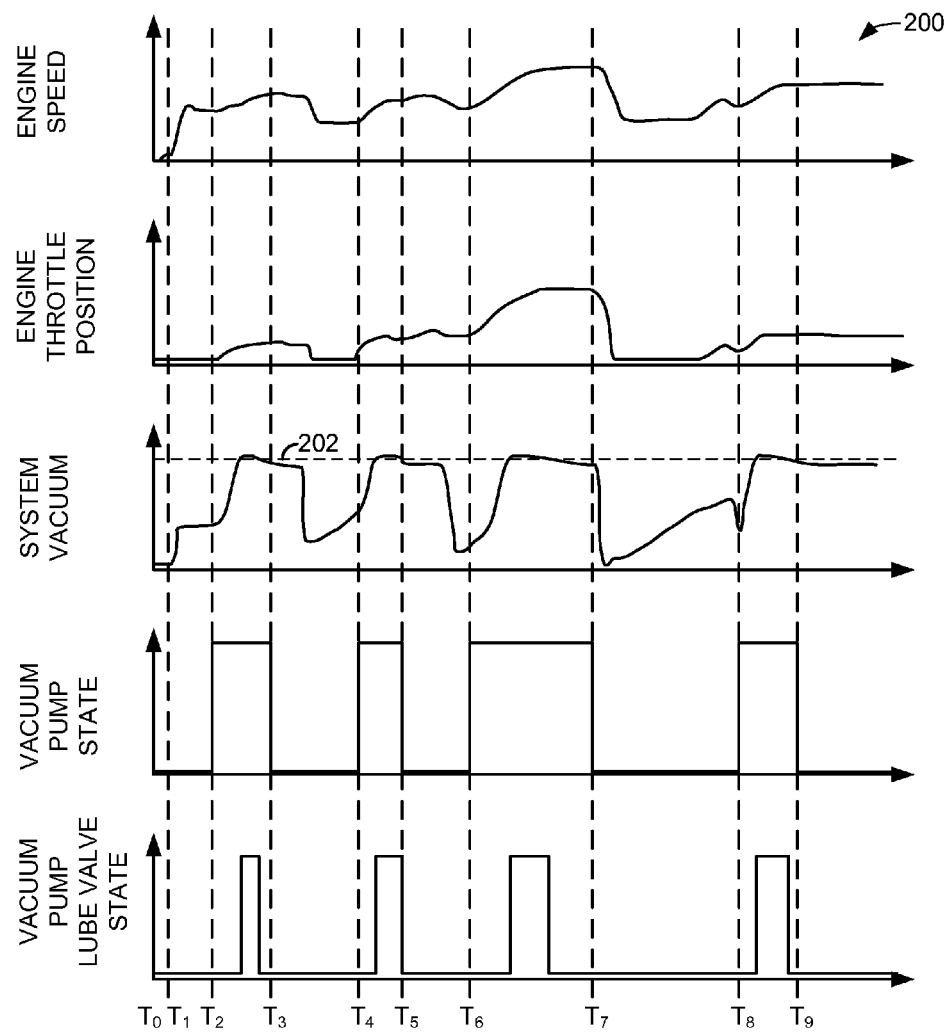
FIG. 2 shows simulated signals of interest during vehicle operation.

The present description is related to producing vacuum to assist in actuator operation. FIG. 1 shows one example system for producing vacuum that is used to assist actuator operation. FIG. 2 shows simulated signals of interest to improve vacuum pump operation while generating vacuum according to the methods of FIG. 3.

Referring to FIG. 1, internal combustion engine 10, comprising a plurality of cylinders, one cylinder of which is shown in FIG. 1, is controlled by electronic engine controller 12. Engine 10 includes combustion chamber 30 and cylinder walls 32 with piston 36 positioned therein and connected to crankshaft 40. Crankshaft 40 is located within crankcase 34. Combustion chamber 30 is shown communicating with intake manifold 44 and exhaust manifold 48 via respective intake valve 52 and exhaust valve 54. Each intake and exhaust valve may be operated by an intake cam 51 and an exhaust cam 53. Alternatively, one or more of the intake and exhaust valves may be operated by an electromechanically controlled valve coil and armature assembly. The position of intake cam 51 may be determined by intake cam sensor 55. The position of exhaust cam 53 may be determined by exhaust cam sensor 57. Intake valve 52 and exhaust valve 54 are enclosed within cylinder head valve cover 38 which may be sealed from atmosphere.

Engine 10 also includes oil separators 37 for extracting oil from gases, including gases in crankcase 34 and gases within valve cover 38. Additionally, an oil separator 39 may be placed in passage 41 which is positioned between brake booster 140 and intake manifold 44. Gases within engine 10 may be evacuated to the engine intake system 47 upstream of compressor 162 via conduit 49 or downstream of compressor 162 via PCV valve 144 and conduit 43. Thus, gases from crankcase 34 may be inducting into intake system 47 for participating in combustion within combustion chamber 30.

Fuel injector 66 is shown positioned to inject fuel directly into cylinder 30, which is known to those skilled in the art as direct injection. Alternatively, fuel may be injected to an intake port, which is known to those skilled in the art as port injection. Fuel injector 66 delivers liquid fuel in proportion to the pulse width of signal FPW from controller 12. Fuel is delivered to fuel injector 66 by a fuel system (not shown) including a fuel tank, fuel pump, and fuel rail (not shown). Fuel injector 66 is supplied operating current from driver 68 which responds to controller 12. In addition, intake manifold 44 is shown communicating with optional electronic throttle 62 which adjusts a position of throttle plate 64 to control air flow from intake boost chamber 46 to intake manifold 44.

Compressor 162 draws air from air intake 42 to supply boost chamber 46. Exhaust gases spin turbine 164 which is coupled to compressor 162 via shaft 160. Vacuum operated waste gate actuator 72 allows exhaust gases to bypass turbine 164 so that boost pressure may be controlled under varying operating conditions.

Vacuum may be supplied to vacuum operated waste gate actuator 72 and brake booster 140 via vacuum pump 141 and/or intake manifold 44. Air flows in the vacuum system as is indicated by the respective arrows. Vacuum pump 141 includes an inlet port 87 and an output port 85. Check valve 149 limits air flow from vacuum pump 141 to brake booster 140 and allows air flow from brake booster 140 to vacuum pump 141. Check valve 149 opens readily when the brake booster 140 pressure is higher than vane vacuum pump 141 inlet port pressure.

Valve 147 limits air flow from vacuum pump 141 to crankcase 34 and allows air flow from crankcase 34 to vacuum pump 141. Valve 147 may be a check valve that opens at a predetermined pressure or it may be a backpressure relief valve which opens when pressure at pump inlet 87 is particularly low. In some examples, valve 147 may be an electrically operated solenoid valve operated via controller 12. Valve 147 may be described as a vacuum pump lube valve since vapors containing engine oil are directed to vane vacuum pump 141 from crankcase 34 via valve 147. In one example, valve 147 opens when a predetermined pressure differential develops between vane vacuum pump 141 and crankcase 34. Valve 147 may draw engine oil entrained gases from the engine crankcase 34, from within the valve cover 38, or within another portion of engine 10 without assistance from a pump other than vacuum pump 141. For example, oil may be draw into vacuum pump 141 without an oil pump.

Check valve 143 limits air flow from intake manifold 44 to brake booster 140 via passage 41 and allows air flow from brake booster 140 to intake manifold 44 via passage 41. Check valve 143 opens when a very small predetermined pressure differential develops between brake booster 140 and intake manifold 44. Brake booster 140 includes an internal vacuum reservoir and it amplifies force provided by foot 152 via brake pedal 150 to master cylinder 148 for applying vehicle brakes (not shown). System vacuum level may be sensed via vacuum sensor 142. Passage 45 provides fluidic communication between brake booster 140, intake manifold 44 and vacuum pump 141.

Distributorless ignition system 88 provides an ignition spark to combustion chamber 30 via spark plug 92 in response to controller 12. Universal Exhaust Gas Oxygen (UEGO) sensor 126 is shown coupled to exhaust manifold 48 upstream of catalytic converter 70. Alternatively, a two-state exhaust gas oxygen sensor may be substituted for UEGO sensor 126.

Converter 70 can include multiple catalyst bricks, in one example. In another example, multiple emission control devices, each with multiple bricks, can be used. Converter 70 can be a three-way type catalyst in one example.

Controller 12 is shown in FIG. 1 as a conventional microcomputer including: microprocessor unit 102, input/output ports 104, non-transitory read-only memory 106, random access memory 108, keep alive memory 110, and a conventional data bus. Controller 12 is shown receiving various signals from sensors coupled to engine 10, in addition to those signals previously discussed, including: engine coolant temperature (ECT) from temperature sensor 112 coupled to cooling sleeve 114; a position sensor 134 coupled to an accelerator pedal 130 for sensing accelerator position adjusted by foot 132; a position sensor 154 coupled to brake pedal 150 for sensing brake pedal position, a pressure sensor 142 for sensing brake booster vacuum; a knock sensor for determining ignition of end gases (not shown); a measurement of engine manifold pressure (MAP) from pressure sensor 122 coupled to intake manifold 44; an engine position sensor from a Hall effect sensor 118 sensing crankshaft 40 position; a measurement of air mass entering the engine from sensor 120 (e.g., a hot wire air flow meter); and a measurement of throttle position from sensor 58. Barometric pressure may also be sensed (sensor not shown) for processing by controller 12. In a preferred aspect of the present description, engine position sensor 118 produces a predetermined number of equally spaced pulses every revolution of the crankshaft from which engine speed (RPM) can be determined.

In some examples, the engine may be coupled to an electric motor/battery system in a hybrid vehicle. The hybrid vehicle may have a parallel configuration, series configuration, or variation or combinations thereof. Further, in some examples, other engine configurations may be employed, for example a diesel engine.

During operation, each cylinder within engine 10 typically undergoes a four stroke cycle: the cycle includes the intake stroke, compression stroke, expansion stroke, and exhaust stroke. During the intake stroke, generally, the exhaust valve 54 closes and intake valve 52 opens. Air is introduced into combustion chamber 30 via intake manifold 44, and piston 36 moves to the bottom of the cylinder so as to increase the volume within combustion chamber 30. The position at which piston 36 is near the bottom of the cylinder and at the end of its stroke (e.g. when combustion chamber 30 is at its largest volume) is typically referred to by those of skill in the art as bottom dead center (BDC).

During the compression stroke, intake valve 52 and exhaust valve 54 are closed. Piston 36 moves toward the cylinder head so as to compress the air within combustion chamber 30. The point at which piston 36 is at the end of its stroke and closest to the cylinder head (e.g. when combustion chamber 30 is at its smallest volume) is typically referred to by those of skill in the art as top dead center (TDC).

In a process hereinafter referred to as injection, fuel is introduced into the combustion chamber. In a process hereinafter referred to as ignition, the injected fuel is ignited by known ignition means such as spark plug 92, resulting in combustion. During the expansion stroke, the expanding gases push piston 36 back to BDC. Crankshaft 40 converts piston movement into a rotational torque of the rotary shaft.

Finally, during the exhaust stroke, the exhaust valve 54 opens to release the combusted air-fuel mixture to exhaust manifold 48 and the piston returns to TDC. Note that the above is described merely as an example, and that intake and exhaust valve opening and/or closing timings may vary, such as to provide positive or negative valve overlap, late intake valve closing, or various other examples.

Thus, the system of FIG. 1 provides for an engine vacuum system, comprising: an engine including a crankcase vent and an oil separator located along the crankcase vent; and a vacuum pump in fluidic communication with the engine and a vacuum consumer, a vacuum pump inlet port in fluidic communication with a passage entering an interior of the engine, the passage absent an oil pump along its length. The engine vacuum system further comprises a vacuum pump exhaust port of the vacuum pump in fluid communication with an oiled interior region of the engine.

In some examples, the engine vacuum system includes where the passage terminates within the engine in an area that holds gases. The engine vacuum system includes where the passage terminates within the engine without being in fluidic communication to an oil pump. The engine vacuum system further comprises a control valve located along a length of the passage. The engine vacuum system includes where the control valve allows flow from the engine's oiled compartment to the vacuum pump inlet and prevents reverse flow (from the vacuum pump inlet port to the engine). In some examples, the engine vacuum system includes where the control valve opens in response to a predetermined amount of vacuum being present in a passage leading from the vacuum consumer to the vacuum pump inlet port. The engine vacuum system includes where the vacuum consumer is a brake booster.

Figure 3:
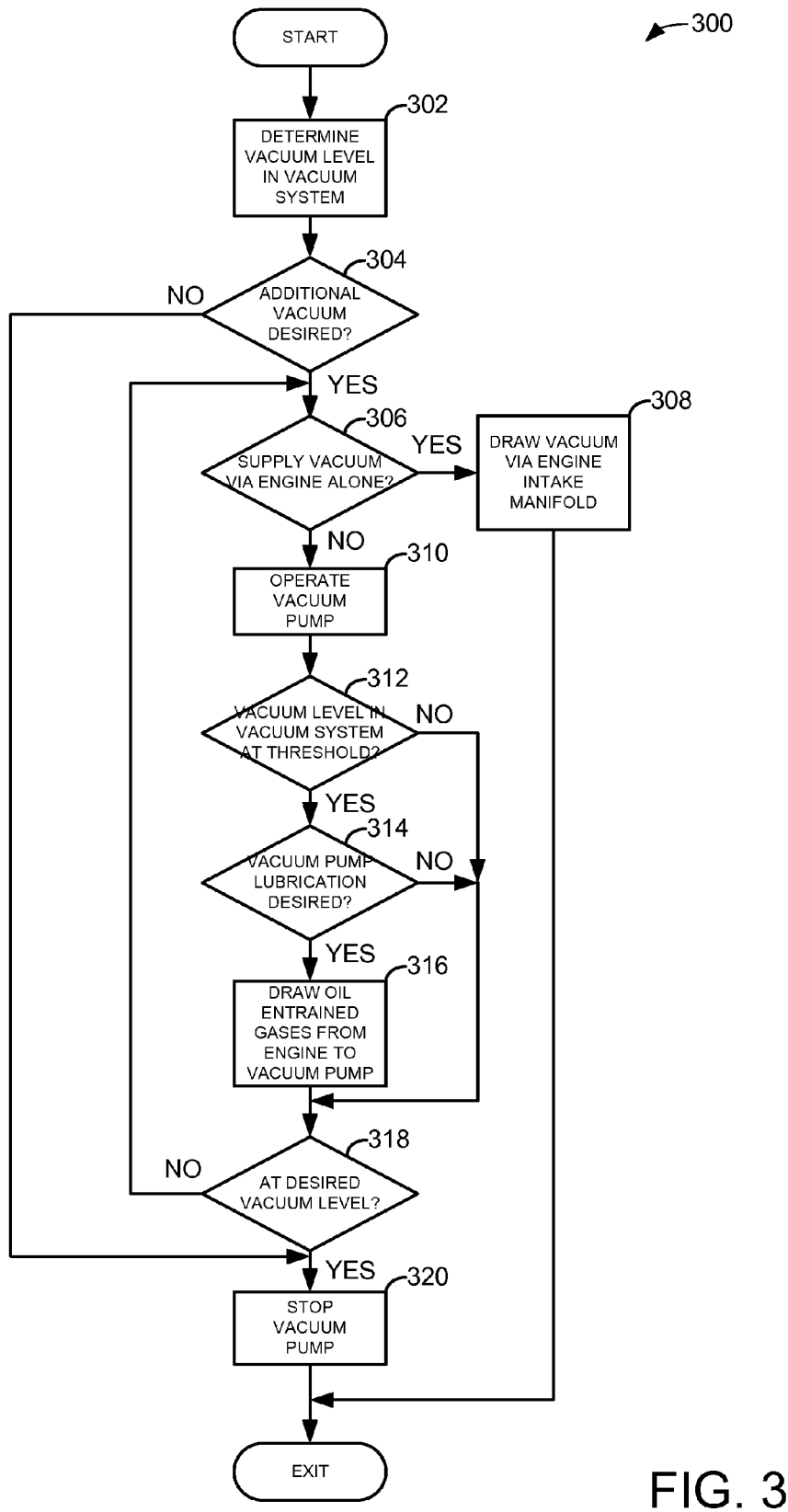
FIG. 3 shows a flowchart of a method for operating a vacuum pump during selected engine operating conditions.

Referring now to FIG. 2, simulated signals of interest during engine operation are shown. Vertical markers $T_0$-$T_9$ identify particular times of interest during the operating sequence. Similar signals may be observed when the method of FIG. 3 is executed by controller 12 of FIG. 1.

The first plot from the top of FIG. 2 shows engine speed versus time. Time starts at the left side of the plot and increases to the right. Engine speed is lowest at the X axis and it increases in the direction of the Y axis arrow.

The second plot from the top of FIG. 2 shows engine throttle position versus time. Time starts at the left side of the plot and increases to the right. Throttle position is lowest (most closed) at the X axis and it increases in the direction of the Y axis arrow.

The third plot from the top of FIG. 2 shows system vacuum (e.g., vacuum that is available to vacuum actuators) versus time. Time starts at the left side of the plot and increases to the right. Vacuum is lowest at the X axis and it increases in the direction of the Y axis arrow. Horizontal line 202 represents a threshold vacuum level if exceeded causes a vacuum pump lubrication valve to open.

The fourth plot from the top of FIG. 2 shows vacuum pump state (e.g., vacuum on or off) versus time. Time starts at the left side of the plot and increases to the right. The vacuum pump is activated when the vacuum pump state trace is at a higher level. The vacuum pump is not activated when the vacuum pump state trace is at a lower level.

The fifth plot from the top of FIG. 2 shows vacuum pump lube valve state (e.g., vacuum on or off) versus time. Time starts at the left side of the plot and increases to the right. The vacuum pump is activated when the vacuum pump state trace is at a higher level. The vacuum pump is not activated when the vacuum pump state trace is at a lower level.

The vacuum pump's purpose is to restore vacuum in a reservoir after vacuum use. Vacuum is consumed on a brake apply and vacuum is also consumed on a brake release. The vacuum pump readies the vehicle for the next brake usage by replenishing vacuum after use. Of course, other vacuum powered devices besides the brake booster may deplete vacuum from the system.

A typical system uses intake manifold to provide much of the required vacuum (via check valve 143). If the intake manifold provides sufficient vacuum, the electrically driven vane pump is not operated.

At time $T_0$, engine speed is zero indicating that the engine is stopped. The engine throttle is closed and there is no system vacuum (e.g., no vacuum in the vacuum system to supply vacuum consumers). The vane vacuum pump is stopped and the vane vacuum pump lube valve state is closed to indicate no engine gases or oil mist is being supplied to the vane vacuum pump.

At time $T_1$, the engine is started in response to a driver's request to start the engine. The engine throttle remains closed and some vacuum is produced in the system via the engine intake manifold. The vacuum pump is turned off to reduce fuel consumption, but in some examples, the vacuum pump may be commanded on during engine starting. The vacuum pump lube valve state remains low indicating that the vacuum pump lube valve is closed and inhibiting oil from entering the vane vacuum pump via the engine.

At time $T_2$, the engine throttle position is increased (e.g., opened further) in response to a driver depressing an accelerator pedal and the vacuum pump is activated. The vacuum pump may be activated in response to an amount of time since engine start and a low vacuum indication. The engine speed begins to increase in response to the increase in throttle position. Further, the system vacuum increases as the vane vacuum pump evacuates air from the vacuum system in response to the vane vacuum pump being activated. The vacuum pump lube valve remains closed while the vacuum level is low.

Between time $T_2$ and time $T_3$, the vacuum pump lube valve changes state from closed to open and then back to closed. The vacuum pump lube valve opens in response to a level of vacuum in the vacuum system exceeding a threshold vacuum level 202. The vacuum pump lube valve closes in response to the level of vacuum in the vacuum system being less than threshold vacuum level 202. The system vacuum level varies in response to vacuum provided by the engine and the vacuum pump as well as the amount of vacuum consumed by vacuum actuators. Gases from the engine (e.g., from the crankcase or within the cylinder head and cylinder head covers) enter the vacuum pump inlet port when the vacuum pump lube valve is in an open state. The gases may include engine oil which is entrained in the gases. In this way, the vacuum pump may be lubricated without an oil pump.

At time $T_3$, the engine or driver demand torque is reduced by the driver (not shown) and the throttle position is reduced in response to the reduction in driver demand torque. The vacuum pump state is transitioned to a low level in response to a reduced engine load and the vacuum system vacuum level. At lower engine loads, the engine may provide vacuum to the vacuum system after air is evacuated from the engine intake manifold. Thus, vacuum may be provided without the vacuum pump so that the vacuum pump does not need to be operated and so that energy may be conserved.

Between time $T_3$ and time $T_4$, the vehicle brakes are applied (not shown) and the brake booster consumes vacuum. Consequently, the system vacuum level decreases and then begins to increase in response to air being drawn from the vacuum system to the engine intake manifold.

At time $T_4$, the engine throttle opening amount is increased in response to driver demand torque (not shown) and engine speed begins to increase in response to throttle position. The vacuum pump is activated in response to system vacuum and the reduction in engine vacuum caused by the increase in throttle opening amount. The vacuum pump evacuates air from the vacuum system when activated.

Between time $T_4$ and time $T_5$, the vacuum pump lube valve changes state to allow gases to flow from inside the engine to the vacuum pump inlet port. Thus, pressure in the engine crankcase is reduced and oil may be drawn from the engine with gases via vacuum produced by the vacuum pump. The oil may lubricate the vacuum pump. Further, the gases moved from the engine via vacuum are directed back into the engine's interior region where they may be constrained from entering the ambient atmosphere.

At time $T_5$, the engine throttle position is reduced in response to a reduction in driver demand torque (not shown). The vacuum pump state transitions to a lower level indicating that the vacuum pump has been deactivated. The vacuum pump lube valve also changes state in response to a reduction in system vacuum as a vehicle brake is applied and the brake booster consumes some vacuum.

Between time $T_5$ and time $T_6$, the system vacuum level decreases further in response to increased application of vehicle brakes. The engine continues to run and the engine throttle position is open enough to allow air to flow into the engine intake manifold.

At time $T_6$, the vacuum system vacuum level decreases to a level where the vacuum pump is reactivated in response to low system vacuum. The vacuum pump state changes from a lower level to a higher level to indicate that the vacuum pump is reactivated.

Between time $T_6$ and time $T_7$, the system vacuum level increases in response to activating the vacuum pump. Consequently, vacuum in the vacuum system exceeds the threshold vacuum level 202 and the vacuum pump lube valve changes to an open state to allow engine gases to flow from inside the engine to the vacuum pump. The engine gases are also returned to the interior of the engine so as to limit engine gases from entering the atmosphere. The vacuum pump lube valve also closes (e.g., vacuum pump lube valve change state from a higher level to a lower level) after a small amount of vacuum in the vacuum system is consumed. The engine throttle and engine speed continue to increase in response to an increased driver demand torque (not shown).

At time $T_7$, the driver reduces demand torque (not shown) and the throttle opening amount is reduced in response to the lower driver demand torque. The engine speed begins to be reduced in response to the reduced throttle opening amount. The driver also applies the vehicle brake (not shown) and the vacuum in the vacuum system is reduced in response to applying the vehicle brakes. The vacuum pump state transitions to a lower level to indicate that the vacuum pump is stopped in response to reducing the throttle opening amount.

Between time $T_7$ and time $T_8$, the vacuum level in the vacuum system increases as air is drawn from the vacuum system into the engine intake system. Further, the engine throttle is opened in response to an increasing driver demand torque (not shown) and engine speed increases in response to the increased throttle opening amount. Just before time $T_8$ the vehicle brakes are applied by the driver and the throttle opening amount is reduced in response to a reduced driver demand torque (not shown).

At time $T_8$, the vacuum pump state changes from a lower level to a higher level to indicate that the vacuum pump is activated and producing vacuum. The vacuum pump is activated in response to the lower vacuum level and in response to the engine operating at conditions where vacuum production may be less than a threshold level.

Between time $T_8$ and time $T_9$, the vacuum pump lube valve changes state from closed to open and back to closed in response to the vacuum level in the vacuum system. In this way, gases may flow from the engine to the vacuum pump during limited conditions. Further, opening the vacuum pump lube valve during only conditions of high vacuum in the vacuum system reduces the amount of oil that may enter the vacuum system via engine gases from the engine crankcase, for example.

At time $T_9$, the vacuum pump is stopped as indicated by the vacuum pump state transitioning to a lower level. The vacuum pump may be deactivated in response to the level of vacuum in the vacuum system and intake manifold pressure, for example.

Referring now to FIG. 3, a high level flowchart for providing vacuum to a vacuum system is shown. The method of FIG. 3 may be provided via executable instructions stored in non-transitory memory of controller 12 of FIG. 1.

At 302, method 300 determines a vacuum level in the vacuum system. In one example, a pressure sensor may sense vacuum in the vacuum system. The vacuum level may be indicative of whether or not vacuum actuators may be activated via system vacuum. Additionally, method 300 may also determine other operating conditions at 302. For example, method 300 may determine throttle position, engine intake manifold pressure, engine temperature, vehicle speed, and ambient pressure at 302. Method 300 proceeds to 304 after the vacuum level in the vacuum system has been determined.

At 304, method 300 judges whether or not additional vacuum in the vacuum system is desired. In one example, additional vacuum in the vacuum system is desired when the vacuum level is less than a threshold amount of vacuum. In other examples, it may be judges that additional vacuum is desired when a combination of conditions are met. For example, additional vacuum may be desired when the vacuum level is less than a threshold amount of vacuum when the vehicle is in motion so as to provide vacuum to assist in braking If additional vacuum is desired, the answer is yes and method 300 proceeds to 306. Otherwise, the answer is no and method 300 proceeds to 320.

At 306, method 300 judges whether or not to supply vacuum to the vacuum system via the engine intake manifold alone. In one example, vacuum is provided to the vacuum system when engine intake manifold pressure is less than a threshold pressure. Otherwise, vacuum is provided to the vacuum system via a vacuum pump. In some examples, vacuum may be provided by the intake manifold whenever pressure in the intake manifold is less than pressure in the vacuum system. If method 300 judges that vacuum is to be supplied via the engine intake manifold, the answer is yes and method 300 proceeds to 308. Otherwise, the answer is no and method 300 proceeds to 310. If intake manifold vacuum is deeper than booster vacuum, a slight delay in turning on the pump allows the intake manifold first chance at evacuating the brake booster (e.g. vacuum reservoir).

At 310, method 300 provides vacuum to the vacuum system via drawing air from the vacuum system to the engine intake manifold. Air may be drawn from the vacuum system to the intake manifold automatically when pressure in the engine intake manifold is less than pressure in the vacuum system. Alternatively, an electromagnetically operated valve may open to allow air to flow from the vacuum system to the engine intake manifold when pressure in the engine intake manifold is less than pressure in the vacuum system. The engine may stop providing vacuum to the vacuum system when pressure in the engine intake manifold is greater than pressure in the vacuum system. Method 300 proceeds to exit after the engine provides vacuum to the vacuum system.

At 310, method 300 activates the vacuum pump. In one example, the vacuum pump may be an electrical vacuum pump that is activated via supplying electrical power to the vacuum pump. In another example, the vacuum pump may be mechanically activated via closing a clutch that causes the vacuum pump to rotate. Method 300 proceeds to 312 after the vacuum pump is activated.

At 312, method 300 judges whether or not a vacuum level in the vacuum system is greater than a threshold vacuum. In one example, method 300 may judge a vacuum level in the vacuum system is greater than a threshold vacuum via comparing an output of a pressure or vacuum sensor against the threshold vacuum. In another example, method 300 may judge that vacuum in the vacuum system is greater than a threshold vacuum when a check valve opens in response to a pressure difference across the check valve. If method 300 judges that the vacuum level in the vacuum system is not greater than a threshold vacuum level, the answer is no and method 300 proceeds to 318. Otherwise, the answer is yes and method 300 proceeds to 314.

At 314, method 300 judges whether or not vacuum pump lubrication is desired. In one example, it may be determined that vacuum pump lubrication is desired when a vacuum level in the system is greater than a threshold vacuum. For example, if vacuum across a check valve is greater than a threshold vacuum, the check valve may open and allow gases entrained with engine oil to be drawn from an interior portion of an engine into the vacuum pump inlet port. Further, the engine gases may be expelled from the vacuum pump to an interior portion of the engine so that gases may not escape to atmosphere. Alternatively, vacuum pump lubrication may be determined based on the amount of time the vacuum pump is activated. If the vacuum pump has been activated for more than a threshold amount of time, a valve between an interior portion of an engine and the vacuum pump may be electromagnetically opened to allow gases entrained with oil to lubricate the vacuum pump. If method 300 judges that vacuum pump lubrication is desired, the answer is yes and method 300 proceeds to 316. Otherwise, the answer is no and method 300 proceeds to 318.

At 316, oil entrained gases are drawn from an interior portion of an engine to a vacuum inlet port of a vacuum pump. The oil entrained gases are drawn to the vacuum pump without a separate oil pump. In one example, the gases are drawn from the engine crankcase. In another example, the gases are drawn from under a valve cover. The gases are also returned to an interior region of the engine so as to reduce the possibility of gases escaping to atmosphere. The gases may be returned to the crankcase or the cylinder head. In one example, the vacuum pump provides vacuum so that pressure in the vacuum system is less than in the engine crankcase so that gases flow from the engine crankcase to the vacuum pump. Method 300 proceeds to 318 after oil entrained gases are drawn from the engine to the vacuum pump via vacuum supplied by the vacuum pump.

At 318, method 300 judges whether or not vacuum in the vacuum system is at a desired level. In one example, vacuum in the vacuum system is determined via a sensor and compared to a desired vacuum level. If vacuum in the vacuum system is at the desired level, the answer is yes and method 300 proceeds to 320. Otherwise, the answer is no and method 300 returns to 306 so that additional vacuum may be supplied to the vacuum system.

At 320, method 300 deactivates and stops the vacuum pump to conserve energy. The vacuum pump may be deactivated by decoupling electrical energy from the vacuum pump. Alternatively, the vacuum pump may be deactivated via opening a clutch. Method 300 proceeds to exit after the vacuum pump is stopped.

The method of FIG. 3 provides for drawing gases from an interior portion of an engine; and lubricating a vacuum pump via oil entrained in the gases. The engine vacuum system includes where the gases are drawn from an engine crankcase. The engine vacuum system further comprises returning the gases to the interior portion of the engine. The engine vacuum system includes where the gases are drawn through a check valve to an inlet of the vacuum pump without an oil pump. The engine vacuum system includes where vanes of the vacuum pump are lubricated. The engine vacuum system includes where gases flow from the interior portion of the engine only when a vacuum level at the vacuum pump inlet is greater than a threshold vacuum.

In another example, the method of FIG. 3 provides for drawing gases from an interior portion of an engine in response to a vacuum level in a vacuum system being less than a threshold vacuum level; lubricating a vacuum pump via oil entrained in the gases; and returning the gases to the interior portion of the engine. The method includes where a check valve limits flow of the gases from the interior portion of the engine to the vacuum pump. The method further comprises drawing air from a brake booster to an inlet of the vacuum pump. The method further comprises drawing air from a passage between the vacuum pump and a brake booster into an intake manifold of the engine. The method includes where the gases are returned to the crankcase. The method also includes where the gases are combusted in the engine.

As will be appreciated by one of ordinary skill in the art, the methods described in FIG. 3 may represent one or more of any number of processing strategies such as event-driven, interrupt-driven, multi-tasking, multi-threading, and the like. As such, various steps or functions illustrated may be performed in the sequence illustrated, in parallel, or in some cases omitted. Likewise, the order of processing is not necessarily required to achieve the objects, features, and advantages described herein, but is provided for ease of illustration and description. Although not explicitly illustrated, one of ordinary skill in the art will recognize that one or more of the illustrated steps or functions may be repeatedly performed depending on the particular strategy being used.

This concludes the description. The reading of it by those skilled in the art would bring to mind many alterations and modifications without departing from the spirit and the scope of the description. For example, single cylinder, I2, I3, I4, I5, V6, V8, V10, V12 and V16 engines operating in natural gas, gasoline, diesel, or alternative fuel configurations could use the present description to advantage.

The invention claimed is:

1. An engine vacuum system, comprising:
an engine including a crankcase vent and an oil separator located along the crankcase vent; and
a vacuum pump in fluidic communication with the engine and a vacuum consumer, a vacuum pump inlet port in fluidic communication with a passage entering an interior of the engine, the passage absent an oil pump along its length.

2. The engine vacuum system of claim 1, further comprising a vacuum pump exhaust port of the vacuum pump in fluid communication with an oiled interior region of the engine.

3. The engine vacuum system of claim 1, where the passage terminates within the engine in an area that holds gases and a solenoid valve controls flow through the passage.

4. The engine vacuum system of claim 3, where the passage terminates within the engine without being in fluidic communication to an oil pump.

5. The engine vacuum system of claim 4, further comprising a control valve located along a length of the passage.

6. The engine vacuum system of claim 5, where the control valve allows flow from the engine to the vacuum pump and limits flow from the vacuum pump inlet port to the engine.

7. The engine vacuum system of claim 1, where the control valve opens in response to a predetermined amount of vacuum being present in a passage leading from the vacuum consumer to the vacuum pump inlet port.

8. The engine vacuum system of claim 1, where the vacuum consumer is a brake booster.

9. A method for providing vacuum, comprising:
drawing gases from an interior portion of an engine; and
lubricating a vacuum pump via oil entrained in the gases.

10. The engine vacuum system of claim 9, where the gases are drawn from an engine crankcase.

11. The engine vacuum system of claim 9, further comprising returning the gases to the interior portion of the engine.

12. The engine vacuum system of claim 9, where the gases are drawn through a check valve to an inlet of the vacuum pump without an oil pump.

13. The engine vacuum system of claim 9, where vanes of the vacuum pump are lubricated.

14. The engine vacuum system of claim 9, where gases flow from the interior portion of the engine only when a vacuum level at the vacuum pump inlet is greater than a threshold vacuum.

15. A method for providing vacuum, comprising:
   drawing gases from an interior portion of an engine in response to a vacuum level in a vacuum system being less than a threshold vacuum level;
   lubricating a vacuum pump via oil entrained in the gases; and
   returning the gases to the interior portion of the engine.

16. The method of claim 15, where a check valve limits flow of the gases from the interior portion of the engine to the vacuum pump.

17. The method of claim 15, further comprising drawing air from a brake booster to an inlet of the vacuum pump.

18. The method of claim 15, further comprising drawing air from a passage between the vacuum pump and a brake booster into an intake manifold of the engine.

19. The method of claim 15, where the gases are returned to the crankcase.

20. The method of claim 19, where the gases are combusted in the engine.

\* \* \* \* \*